(12) United States Patent
Mansour et al.

(10) Patent No.: US 10,790,936 B1
(45) Date of Patent: Sep. 29, 2020

(54) USE OF ORTHOGONAL CODING TO HELP FACILITATE MULTI-LAYER TRANSMISSION OF USER-PLANE DATA FROM CLOSELY SPACED ANTENNAS

(71) Applicant: Sprint Spectrum L.P., Overland Park, KS (US)

(72) Inventors: Nagi Mansour, Arlington, VA (US); Akin Ozozlu, Mclean, VA (US); Noman M. Alam, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/237,953

(22) Filed: Jan. 2, 2019

(51) Int. Cl.
*H04L 1/06* (2006.01)
*H04B 7/06* (2006.01)

(52) U.S. Cl.
CPC ......... *H04L 1/0668* (2013.01); *H04B 7/0669* (2013.01); *H04L 1/0625* (2013.01); *H04L 1/0631* (2013.01)

(58) Field of Classification Search
CPC .... H04L 1/0668; H04L 1/0625; H04L 1/0631
USPC ....................................................... 375/267
See application file for complete search history.

(56) References Cited

U.S. PATENT DOCUMENTS

| | | | | |
|---|---|---|---|---|
| 4,706,299 A | * | 11/1987 | Jorgensen | G06E 1/04 326/60 |
| 6,504,517 B1 | * | 1/2003 | Liu | H01Q 1/246 343/853 |
| 9,622,233 B1 | * | 4/2017 | Mansour | H04W 52/04 |
| 2003/0235147 A1 | * | 12/2003 | Walton | H04L 1/0618 370/204 |
| 2011/0080972 A1 | * | 4/2011 | Xi | H04B 7/0623 375/267 |
| 2016/0315748 A1 | * | 10/2016 | Chen | H04W 52/04 |
| 2017/0102878 A1 | * | 4/2017 | Mundt | G06F 3/0619 |

* cited by examiner

*Primary Examiner* — Wednel Cadeau

(57) ABSTRACT

Disclosed is a mechanism to help a user equipment device (UE) transmit multiple distinct bit streams concurrently to a base station with reduced risk of interference. The UE will orthogonally encode the multiple distinct bit streams using orthogonal binary codes to produce orthogonally encoded bit streams, and the UE will add the orthogonally coded bit streams together to produce a resulting bit stream and will transmit that resulting bit stream on an antenna path to the base station. Upon receipt of the transmitted bit stream, the base station could then apply the same orthogonal binary codes to the bit stream in order to extract the underlying multiple distinct bit streams.

19 Claims, 5 Drawing Sheets

US 10,790,936 B1

USE OF ORTHOGONAL CODING TO HELP FACILITATE MULTI-LAYER TRANSMISSION OF USER-PLANE DATA FROM CLOSELY SPACED ANTENNAS

BACKGROUND

A wireless communication system typically includes a number of base stations that are configured to provide wireless coverage areas, such as cells and cell sectors, in which user equipment devices (UEs) such as cell phones, tablet computers, tracking devices, embedded wireless modules, and other wirelessly equipped communication devices (whether or not user operated), can operate. In turn, each base station could be coupled with network infrastructure that provides connectivity with one or more transport networks, such as the public switched telephone network (PSTN) and/or the Internet for instance. With this arrangement, a UE within coverage of the system could engage in air interface communication with a base station and could thereby communicate via the base station with various remote network entities or with other UEs served by the base station.

Each coverage area in such a system could operate in accordance with a particular radio access technology, with air-interface communications from the base stations to UEs defining a downlink or forward link and air-interface communications from the UEs to the base stations defining an uplink or reverse link.

Over the years, the industry has embraced various "generations" of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive-MIMO, beamforming, and/or other features, to support higher data rates and countless applications, such as mission-critical services, enhanced mobile broadband, and massive Internet of Things (IoT).

In accordance with the radio access technology, each coverage area could operate on a carrier, which could be frequency division duplex (FDD), defining separate radio-frequency channels for downlink and uplink communication, or time division duplex (TDD), with a single radio-frequency channel multiplexed over time between downlink and uplink use. Further, on the downlink and uplink, the carrier could be structured to define various physical channels for carrying information between the base stations and UEs. For example, the air interface could be divided over time into frames, each divided in turn into subframes and timeslots, and the carrier bandwidth could be divided over frequency into subcarriers, which could be grouped within each timeslot to define physical resource blocks (PRBs) in which the subcarriers can be modulated to carry data.

The base station could then be configured to coordinate use of these air-interface resources on an as-needed basis. For example, when the base station has data to transmit to a UE, the base station could allocate particular downlink air-interface resources to carry that data and could accordingly transmit the data to the UE on the allocated downlink resources. And when a UE has data to transmit to the base station, the UE could transmit to the base station an uplink resource request, the base station could responsively allocate particular uplink air-interface resources to carry the data, and the UE could then transmit the data to the base station on the allocated uplink resources.

OVERVIEW

One of the key performance metrics of a wireless communication system is its spectral efficiency, namely, the extent of data that the system can carry per unit of frequency spectrum. The spectral efficiency of a wireless communication system or its base stations could be measured as a quantity of bits per Hertz.

If a wireless communication system has low spectral efficiency, a provider of the system may need to configure the system with additional licensed spectrum, such as wider carriers and/or more carriers, in order to accommodate subscriber communication needs. However, adding licensed spectrum could be costly and therefore undesirable.

One way to help improve spectral efficiency on the uplink is to make use of MIMO technology.

With MIMO, air interface communication can occur concurrently on multiple different radio-frequency (RF) propagation paths, or MIMO "layers," with multiple layers occupying the same frequency resources (e.g., subcarriers and PRBs) as each other. To facilitate this, the transmitter (e.g., UE or base station) could be equipped with multiple transmit antennas, and the receiver (e.g., base station or UE) could be equipped with multiple receive antennas. By suitably weighting and precoding transmissions output via particular transmit antennas, the transmitter can then output spatially separate but concurrent transmissions for receipt by the receiver, with the concurrent transmissions occupying the same frequency resources (e.g., subcarriers) as each other. Because these concurrent transmissions occupy the same frequency resources as each other, MIMO can thereby support a greater extent of data communication per unit frequency, thereby increasing spectral efficiency and possibly avoiding or deferring the need to add more spectrum.

From the perspective of a UE served by a base station, MIMO service can be used in a "single-user MIMO" (SU-MIMO) configuration to help increase the data rate of transmission between the UE and the base station.

On the uplink, for example, when the UE has user-plane data (e.g., application-layer data) to transmit to the base station, the UE could time-division-multiplex (or otherwise divide) that data into multiple separate bit streams, and the UE could (i) modulate uplink PRBs to carry one of the bit streams and output the modulated uplink PRBs as a transmission from one of the UE's antennas to the base station and (ii) concurrently modulate the same uplink PRBs to carry the other bit streams and output those modulated uplink PRBs as a transmission from another one of the UE's antennas to the base station.

Further, the UE could also transmit to the base station from each of the UE's antennas a respective uplink respective demodulation reference signal (DMRS), and the base station could receive and evaluate those uplink DMRSs and provide the UE with associated precoding information that the UE can use to pre-code the UE's uplink transmissions, so as to help enable the base station to separately uncover each transmitted stream.

Likewise, when the base station has user-plane data to transmit to the UE, the base station could time-division-multiplex (or otherwise divide) that data into multiple separate bit streams and the base station could (i) modulate downlink PRBs to carry one of the bit streams and output the modulated downlink PRBs as a transmission from one of the base station's antennas to the UE and (ii) concurrently modulate the same downlink PRBs to carry the other bit streams and output those modulated downlink PRBs as a transmission from another one of the base station's antennas to the UE.

Further, the base station could also transmit from each of the base station's antennas a respective downlink DMRS, and the UE could receive and evaluate those downlink DMRSs and provide the base station with associated pre-coding information that the base station could use to pre-code the base station's downlink transmissions to the UE, to help enable the UE to separately uncover each transmitted stream.

While this process may work in theory, a problem that may arise in practice is that the UE's antennas may be so close together or otherwise configured in a manner that the uplink transmissions by the UE separately from each antenna may combine with each other in an undesired manner that could make it difficult for the base station to separately uncover each transmitted stream. This may happen, for instance if the UE transmits on a carrier in the 2.5 GHz band, where the wavelength of the UE's transmission is on the order of 12 centimeters, but if the UE's antennas are spaced apart from each other by less than 12 centimeters, perhaps just 6 centimeters or so. In that situation, because the base station may not be able to separately uncover the separate bit streams that the UE transmits concurrently from the UE's antennas, SU-MIMO transmission from the UE to the base station may not provide the desired gain in spectral efficiency.

Disclosed is a mechanism to help address this issue while still allowing the UE to concurrently transmit multiple distinct bit streams. According to the disclosure, the UE will orthogonally encode the multiple distinct bit streams using orthogonal binary codes to produce orthogonally encoded bit streams, and the UE will add the orthogonally coded bit streams together to produce a resulting bit stream and will transmit that resulting bit stream on an antenna path to the base station. Upon receipt of the transmitted bit stream, the base station will then apply the same orthogonal binary codes to the bit stream in order to extract the underlying multiple distinct bit streams.

This could be implemented by a UE that has two or more antennas, with the UE transmitting the resulting bit stream from at least one of the UE's antennas (or transmitting the same resulting bit stream concurrently from multiple antennas to provide transmit diversity). This arrangement can help to avoid the issue of transmissions from separate but non-optimally spaced antennas combining in an undesired manner as discussed above. And the use of orthogonal coding could help to enable the base station to uncover each of the underlying bit streams, to help improve spectral efficiency.

Further, even though there may be a risk of interference between concurrent transmissions of different streams from the UE's separate but non-optimally spaced antennas, the UE could carry out this same process to provide concurrent but different transmission of the same bit streams from each of the UE's multiple antennas.

For instance, the UE could orthogonally encode the multiple bit streams using a first set of orthogonal binary codes to produce a first set of encoded bit streams, the UE could add the first set of encoded bit streams together with each other to produce a first resulting bit stream, and the UE could transmit that first resulting bit stream from a first one of the UE's antennas to the base station, using pre-coding as discussed above. And concurrently, the UE could orthogonally encode the same multiple bit streams using a second set of different orthogonal binary codes to produce a second set of encoded bit streams, the UE could add the second set of encoded bit streams together with each other to produce a second resulting bit stream, and the UE could transmit that second resulting bit stream from a second one of the UE's antennas to the base station, also using pre-coding as discussed above. Sending the same bit streams(s) with different orthogonal coding from the UE's multiple antennas could help further enable the base station to uncover the UE's underlying user-plane data.

In addition, the UE could also be configured to receive separate transmissions at each of its multiple antennas. For instance, the base station could provide separate downlink transmissions to the UE respectively for receipt at each of the UE's antennas using SU-MIMO as discussed above. Thus, the UE could use one or more of its antennas respectively to engage in improved uplink transmission of a combination of separate orthogonally encoded bit streams as discussed above, and the UE could use the same antennas to receives downlink SU-MIMO transmission from the base station.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
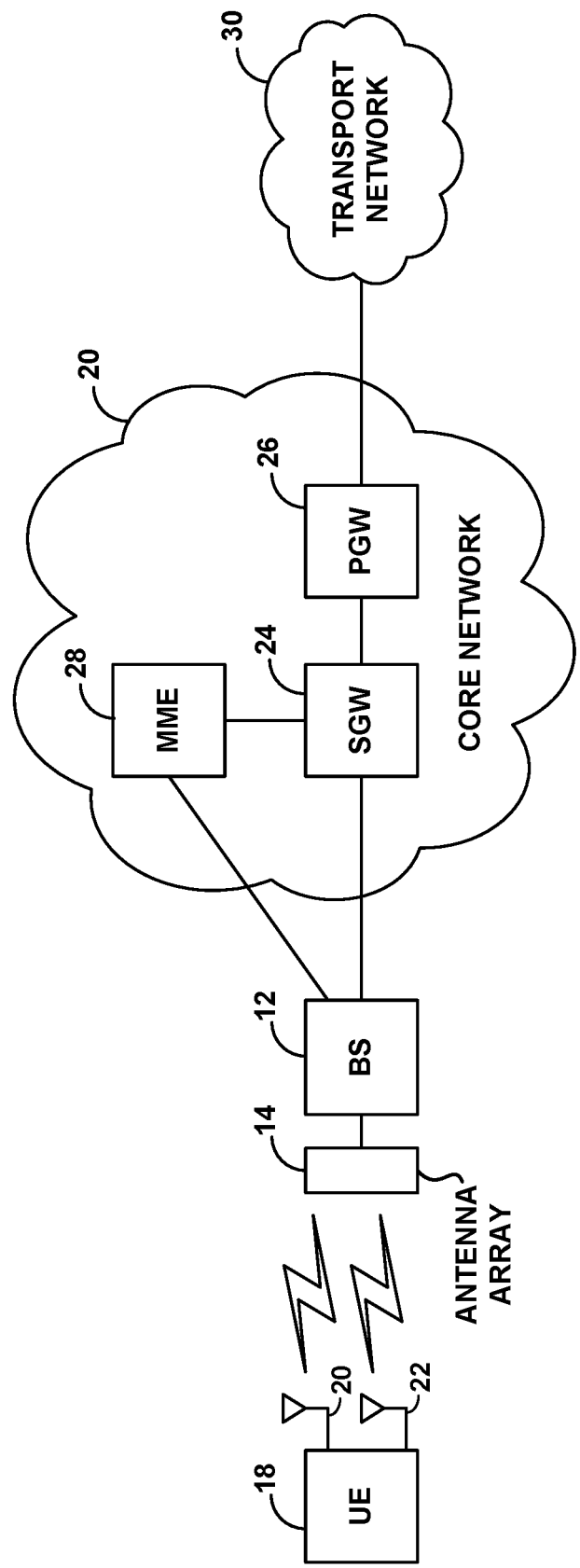
FIG. 1 is a simplified block diagram of a network arrangement in which aspects of the present disclosure can be implemented.

Referring to the drawings, as noted above, FIG. 1 is a simplified block diagram of an example wireless communication system in which various disclosed features can be implemented. It should be understood, however, that numerous variations from this and other disclosed arrangements and operations are possible. For example, elements or operations could be added, removed, combined, distributed, re-ordered, or otherwise modified. In addition, operations described as being performed by one or more entities could be implemented in various ways, such as by a processor executing instructions stored in non-transitory data storage, along with associated circuitry or other hardware, for instance.

As shown in FIG. 1, the example wireless communication system includes a representative base station 12 having an antenna array 14 through which the base station is configured to provide coverage 16 on one or more carriers in one or more frequency bands. The base station could be a macro base station of the type configured to provide a wide range of coverage, and the antenna array could be mounted on a tower or other tall structure. Alternatively, the base station could take other forms, such as a small cell base station, a repeater, a femtocell base station, or the like, which might be configured to provide a smaller range of coverage. The base station could be configured to operate according to a 4G, 5G, or other radio access technology. For instance, the base station could be an LTE evolved Node-B (eNB) or a 5GNR gigabit Node-B (gNB), among other possibilities.

Shown operating within coverage of the base station is then a representative UE 18, which could be a device of one of the types discussed above, among other possibilities. As shown, UE 18 includes at least two antenna 20, 22. For simplicity, this description will discuss an implementation where the UE has just two antennas. But it will be understood that the UE could instead include a different number of antennas (possibly just one, or greater than two) and that principles described herein could extend to apply in that scenario as well. Further, although the UE's antennas are illustrated outside of the block labeled "UE," it will be understood that the antennas could be integrated within in the UE such as within a housing of the UE. Other variations are possible as well.

The base station is shown coupled with a core network 20, which could be an enhanced packet core (EPC) network, a next generation core (NGC) network, or another network including components supporting an applicable radio access technology and providing connectivity with at least one transport network 30, such as the Internet.

In an example implementation as shown, the core network 20 includes a serving gateway (SGW) 24, a packet data network gateway (PGW) 26, and a mobility management entity (MME) 28. In particular, the base station has an interface with the SGW, the SGW has an interface with the PGW, and the PGW provides connectivity with the transport network 30. Further, the base station has an interface with the MME, and the MME has an interface with the SGW.

With this arrangement, the SGW and PGW cooperatively provide user-plane connectivity between the base station and the transport network, to enable UE 18 when served by the base station to engage in communication on the transport network. And the MME operates as a controller to carry out operations such as coordinating UE attachment and setup of user-plane bearers.

As discussed above, the air interface between the base station and UEs within its coverage could be structured to define various air interface resources.

For instance, in the time domain, the air interface could define a continuum of 10-millisecond (ms) frames, each divided into ten 1-ms subframes, and each subframe could be further divided into a number of timeslots, each additionally divided into symbol time segments. And in the frequency domain, the bandwidth of each carrier on which the base station operates could be divided into subcarriers with specified subcarrier spacing on the order of 15 to 240 kHz. With this arrangement, the air interface on each carrier would define an array of resource elements each occupying a subcarrier and symbol time segment, and the base station and UEs could communicate with each other through modulation of the subcarriers to carry data in those resource elements. Variations of this arrangement are possible as well.

Further, particular groupings of resource elements on the air interface could be grouped together to define the PRBs discussed above. In an example implementation, each PRB could span one timeslot in the time domain and a group of subcarriers in the frequency domain. Depending on the carrier bandwidth, the air interface could thus support a certain number of such PRBs across the bandwidth of the carrier within each timeslot.

In addition, certain resource elements on the downlink and uplink could be reserved for particular control-channel or shared-channel communications.

For instance, on the downlink, certain resource elements per subframe (or per downlink subframe in TDD) could be reserved to define a downlink control region for carrying control signaling such as scheduling directives and acknowledgements from the base station to UEs. And other resource elements per subframe could be reserved to define a shared channel in which PRBs could carry scheduled data communications from the base station to UEs. Further, certain resource elements on the downlink could be reserved to carry downlink DMRS transmissions and other special downlink signals.

And on the uplink, certain resource elements per subframe (or per uplink subframe in TDD) could be reserved to define an uplink control region for carrying control signaling such as access requests, channel-quality reports, scheduling requests, and acknowledgements, from UEs to the base station. And other resource elements per subframe could be reserved to define a shared channel in which PRBs could carry scheduled data communications from UEs to the base station. Further, certain resource elements on the uplink could be reserved to carry uplink DMRS transmissions and other special uplink signals.

In operation, when UE 18 enters into coverage of the base station on a carrier, the UE could detect coverage of the base station and could then engage in random access signaling and Radio Resource Control (RRC) configuration signaling with the base station to connect with the base station on the carrier, thus putting the UE in an RRC-connected mode.

Once the UE is connected with the base station, the UE could then transmit to the base station an attach request, which the base station could forward to the MME for processing. And after authentication of the UE, the MME could coordinate setup for the UE of one or more user-plane bearers between the base station and the PGW, to enable the UE to engage in communication on the transport network.

The base station could then serve the UE with data communications.

For instance, when data arrives at the base station for transmission to the UE, the base station could allocate one or more downlink PRBs in a subframe for use to transmit at least a portion of the data, defining a transport block, to the UE. The base station could then transmit to the UE in the control region of that subframe a Downlink Control Information (DCI) message that designates the PRBs, and the base station could accordingly transmit the transport block to the UE in those designated PRBs.

And when the UE has data to transmit to the base station (e.g., for transmission on the transport network), the UE could transmit to the base station a scheduling request that indicates how much data the UE has buffered for transmission. And in response, the base station could allocate one or more uplink PRBs in an upcoming subframe for carrying a transport block of that data from the UE and could transmit to the UE a DCI message that designates those upcoming PRBs. The UE could then accordingly transmit the transport block to the base station in the designated PRBs.

To facilitate SU-MIMO operation, the base station and UE could evaluate each other's DMRS transmissions (as control-plane transmissions) and could provide each other with associated precoding information as discussed above. For instance, to facilitate downlink SU-MIMO transmission to the UE, the UE could evaluate the base station's DMRS transmission respectively for each antenna from which the base station will transmit to the UE and could provide the base station with associated precoding information respectively for each such transmission, and the base station could then apply that precoding information to precode its transmission to the UE respectively from each antenna. And to facilitate uplink SU-MIMO transmission from the UE, the base station could evaluate the UE's DMRS transmission respectively for each antenna from which the UE will transmit to the base station and could provide the UE with associated precoding information respectively for each such transmission, and the UE could then apply that precoding information to precode its transmission to the base station respectively from each antenna.

The base station could coordinate this SU-MIMO transmission process by appropriate signaling within one or more DCI messages that base station sends to the UE, together with any necessary uplink signaling from the UE to the base station. For instance, for downlink transmission, the base station could transmit to the UE a DCI message that specifies the allocated downlink PRBs and that specifies that the base station will be concurrently transmitting the two streams to the UE, and the UE could thus use the UE's two antennas to receive those two streams on the allocated PRBs. And for uplink transmission, the base station could transmit to the UE a DCI message that that specifies the allocated uplink PRBs and that specifies that the UE is to transmit two streams to the base station, and the UE could thus use the UE's two antennas to transmit those two streams on the allocated uplink PRBs.

As discussed above, when the UE has user-plane data to transmit to the base station, the UE might divide (e.g., multiplex) that user-plane data into multiple separate bit streams and use SU-MIMO to transmit one bit stream from one antenna concurrently with transmission of the other stream from the other antenna. (Alternatively, the UE could start with two separate user-plane bit streams to be transmitted concurrently from separate antennas, without splitting apart a set of user-plane data.) As further noted above, however, spacing of the UE's antennas might result in those two transmissions being overly correlated and thus possibly preventing the base station from successfully receiving and uncovering the bit streams.

Figure 2:
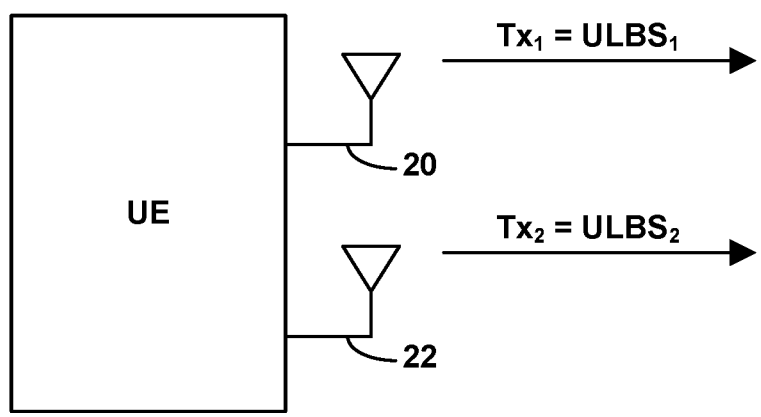
FIG. 2 is a diagram depicting example UE communications in accordance with the disclosure, using two example antennas.

FIG. 2 illustrates an example configuration in which this technological problem might occur. As shown in the example configuration of FIG. 2, the UE could use its two antennas 20, 22 to provide two separate transmissions ($Tx_1$ and $Tx_2$) one carrying a first uplink bit stream $ULBS_1$ and the other carrying a second uplink bit stream ($ULBS_2$). And the UE could also use the same two antennas to receive two separate transmissions ($Rx_1$ and $Rx_2$), one carrying a first downlink bit stream ($DLBS_1$) and the other carrying a second downlink bit stream ($DLBS_2$). If the serving carrier is FDD, then these transmissions and receptions could occur concurrently with other, and if the serving carrier is TDD, then the transmissions could be separated in time from the receptions.

In the example configuration (without limitation), assume that the serving carrier has an uplink wavelength of about 12 centimeters but that the UE's two antennas are only about 6 centimeters apart from each other. As a result, the UE's concurrent transmissions from the two antennas may be correlated with each other to some extent, which could pose issues at the receiving end. For instance, as the transmissions are emitted from the UE's two closely spaced antennas, the transmissions may combine with each other or otherwise interfere with each other such that, even with the precoding, the base station may have difficulty uncovering the underlying user-plane data.

Figure 3:
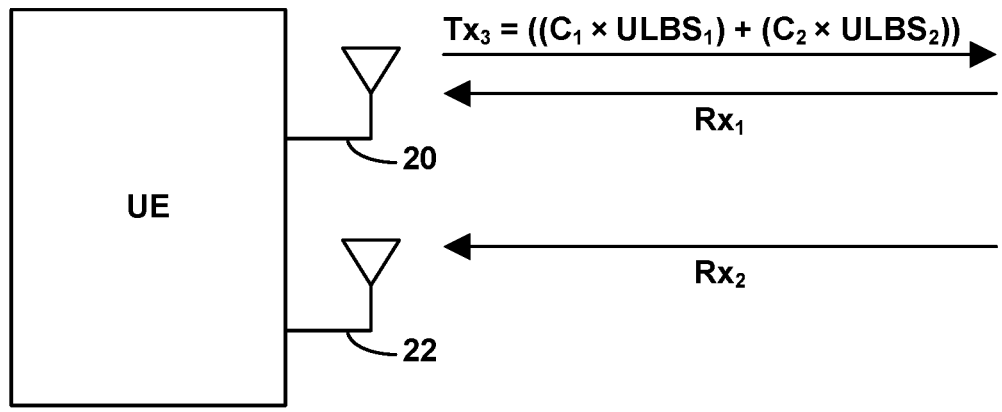
FIG. 3 is another diagram depicting example UE communications in accordance with the disclosure, using two example antennas.

FIG. 3 next illustrates an arrangement according to the present disclosure to help address this technological problem. As shown in FIG. 3, the UE instead transmits a binary combination of the two bit streams from one of the UE's antennas (and perhaps concurrently from one or more other of the UE's antennas), rather than transmitting just one of the bit streams from one of the antennas and just the other bit stream from the other antenna.

In particular, as shown, the UE uses antenna 20 to provide a transmission $Tx_3$ that carries a first combined bit stream ($BS_1$) computed as the sum of orthogonal encodings of the two user-plane bit streams, with the underlying bit streams $ULBS_1$ and $ULBS_2$ being encoded respectively with orthogonal binary codes $C_1$, $C_2$. Namely, the UE could encode $ULBS_1$ with binary code $C_1$ to produce a first encoded bit stream, the UE could encode $ULBS_2$ with binary code $C_2$ to produce a second encoded bit stream, and the UE could sum those two encoded bit streams to produce the first combined bit stream $BS_1$, which the UE could transmit from antenna 20 to the base station.

Further, the UE could also still use antenna 20 to receive $Rx_1$ while concurrently using antenna 22 to receive $Rx_2$. Thus, as shown in FIG. 3, the UE could be configured to use antenna 20 for transmission of the binary combination of orthogonally encoded bit streams $ULBS_1$ and $ULBS_2$, and the UE could further be configured to use antenna 20 and antenna 22 for reception respectively of $Rx_1$ and $Rx_2$.

Figure 4:
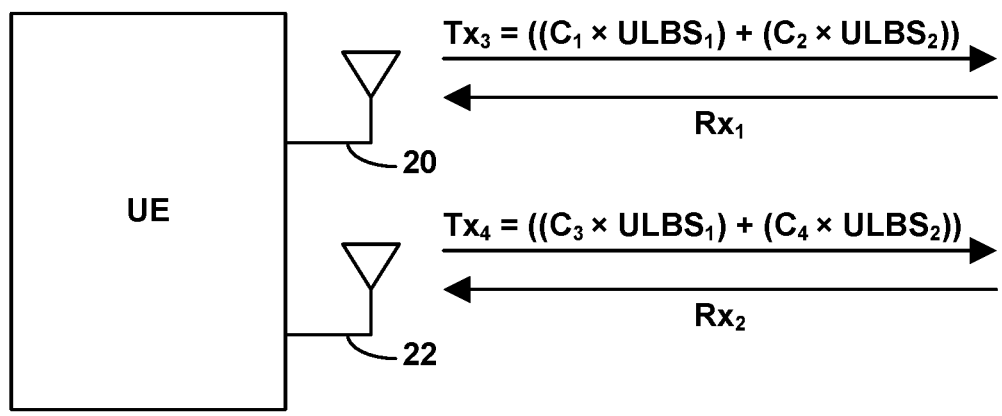
FIG. 4 is another diagram depicting example UE communications in accordance with the disclosure, using two example antennas.

FIG. 4 next illustrates yet another arrangement. Here, the UE is configured as shown in FIG. 3 but additionally transmits a different binary combination of the two uplink bit streams $ULBS_1$ and $ULBS_2$ from the other one of the UE's antennas (and perhaps concurrently from one or more other of the UE's antennas). In particular, the UE uses antenna 22 to provide a transmission $Tx_4$ that carries a second combined bit stream ($BS_2$) computed as the sum of orthogonal encodings of the two user-plane bit streams, with the underlying bit streams $ULBS_1$ and $ULBS_2$ being encoded with different orthogonal binary codes $C_3$, $C_4$ than those used to encode the bit streams in relation to the above-discussed transmission from antenna 20. Namely, the UE could encode $ULBS_1$ with binary code $C_3$ to produce a third encoded bit stream, the UE could encode $ULBS_2$ with binary code $C_4$ to produce a fourth encoded bit stream, and the UE could sum the third and fourth encoded bit streams to produce the second combined bit stream $BS_2$. And the UE could transmit the second combined bit stream $BS_2$ from antenna 22 concurrent with the UE's transmission of the first combined bit stream $BS_1$ from antenna 21.

Although this further arrangement risks the issues noted above regarding interference between transmissions from closely spaced antennas, there could be some scenarios where concurrent transmissions of the first and second combined bit streams $BS_1$ and $BS_2$, with suitable precoding, could successfully reach the base station. And this process of differently orthogonally coding, combining, and transmitting the bit streams from the UE's two antennas concurrently could help enable the base station to successfully uncover the underlying bit streams. For instance, on a per subframe basis or other basis, the base station may combine the received transmissions or select the better of the received transmissions.

As discussed above, the binary codes used for this purpose (e.g., codes $C_1$ and $C_2$ that will be used respectively to encode the bit streams for combined transmission from antenna 20, and likewise codes $C_3$ and $C_4$ that could be used respectively to encode the bit streams for combined transmission from antenna 22) would optimally be orthogonal to each other, in that they would have zero cross-correlation with each other. For instance, the binary codes could be Walsh codes or other orthogonal codes. The UE could be pre-provisioned with logic that causes the UE to apply these particular orthogonal codes, or the base station could dynamically provision the UE with the codes, such as by specifying the codes within an associated DCI message that the base station sends to the UE.

Further, in this process, the act of encoding each underlying bit stream with a binary code could involve XOR'ing (applying the logical XOR operation to) successive bits of the bit stream with the binary code. For instance, if the binary code is 8 bits long, the UE could XOR every eight bits of the bit stream with the binary code. Further, the act of summing the two encoded bit streams could involve AND'ing (applying the logical AND operation to) the two bit streams.

Note also that the UE could apply one or more additional operations in order to produce the resulting combined bit stream (e.g., $BS_1$ or $BS_2$) that the UE will transmit from a given antenna. For instance, the UE could shift bits or take other action, provided that the base station will be correspondingly configured to undo those operations so as to uncover the underlying bit streams.

Figure 5:
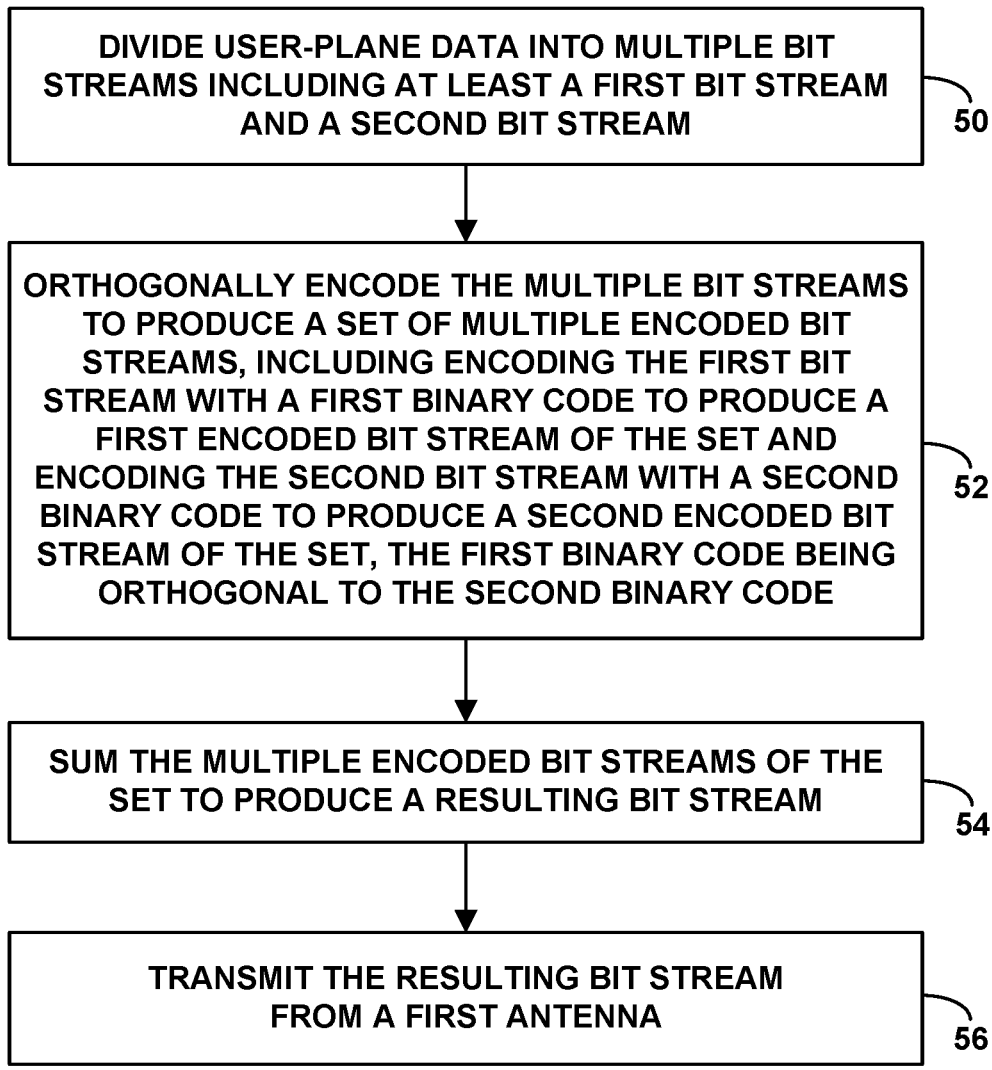
FIG. 5 is a flow chart depicting operations that can be carried out in accordance with the disclosure.

FIG. 5 is next a flow chart depicting a method that could be carried out in accordance with the present disclosure, to facilitate communication of user-plane data between a UE and a base station, in a scenario where the UE has multiple antennas including a first antenna and a second antenna.

As shown in FIG. 5, at block 50, the method includes the UE dividing the user-plane data into multiple bit streams including at least a first bit stream and a second bit stream. At block 52, the method includes the UE orthogonally encoding the multiple bit streams to produce a set of multiple encoded bit streams, including encoding the first bit stream with a first binary code to produce a first encoded bit stream of the set and encoding the second bit stream with a second binary code to produce a second encoded bit stream of the set, the first binary code being orthogonal to the second binary code (e.g., having zero cross-correlation with each other). Further, at block 54, the method includes the UE at least summing the multiple encoded bit streams of the set to produce a resulting bit stream. And at block 56, the method includes the UE transmitting the resulting bit stream from the first antenna.

Note that in practice this method could be carried out continuously for an underlying bit stream, perhaps one being generated or prepared for output on an ongoing basis by the UE. And note that, as discussed above, the orthogonally encoding of the first and second bit streams may help to enable the base station to extract the first and second bit streams upon receipt of the resulting bit stream.

Further, in line with the discussion above, the set of multiple encoded bit streams in this method could be considered a first set and the resulting bit stream could be a first resulting bit stream. The method could then additionally include the UE orthogonally encoding the multiple bit streams to produce a second set of multiple encoded bit streams, including encoding the first bit stream with a third binary code to produce a first encoded bit stream of the second set and encoding the second bit stream with a fourth binary code to produce a second encoded bit stream of the second set, the third binary code being orthogonal to the fourth binary code. And the method could include the UE at least summing the multiple encoded bit streams of the second set to produce a second resulting bit stream and transmitting the second resulting bit stream from the second antenna, perhaps concurrently with transmission of the first resulting bit stream from the first antenna.

In this process, note that the acts of the UE transmitting the first resulting bit stream and the UE transmitting the second resulting bit stream could both occur on an RF carrier that has a wavelength $\lambda$ centimeters, and the UE's first and second antennas could be less than $\lambda/2$ centimeters apart from each other.

In addition, as discussed above, the act of encoding the first bit stream with the first binary code could involve XOR'ing sequential groups of bits of the first bit stream with the first binary code, the act of encoding the second bit stream with the second binary code could involve XOR'ing sequential groups of bits of the second bit stream with the second binary code, and the act of summing the multiple encoded bit streams of the set could involve AND'ing the multiple encoded bit streams together.

Further, as discussed above, the method could additionally involve the UE receiving from the base station a scheduling directive that specifies air interface resources (e.g., frequency-time resources) on which the UE is to transmit the resulting bit stream, in which case the act of the UE transmitting the resulting bit stream could occur on the specified air interface resources in response to and in accordance with the scheduling directive.

As noted above, such a directive could additionally provide precoding information for use by the UE to precode the transmission of the resulting bit stream. For instance, the UE could transmit to the base station, from the first antenna, a DRMS for evaluation by the base station to enable the base station to generate the precoding information, and the base station could then specify the precoding information in the scheduling directive.

The method could then additionally include the base station receiving the transmission of the resulting bit stream from the UE on the specified air interface resources, the base station applying the first binary code to extract the first bit stream from the resulting bit stream, the base station applying by the base station the second binary code to extract the second bit stream from the resulting stream, and the base station combining at least the extracted first and second bit streams to uncover the user-plane data.

Further, as discussed above, the method could additionally include the UE receiving at the first antenna a first downlink stream from the base station concurrently with receiving by the UE at the second antenna a second downlink stream from the base station.

Figure 6:
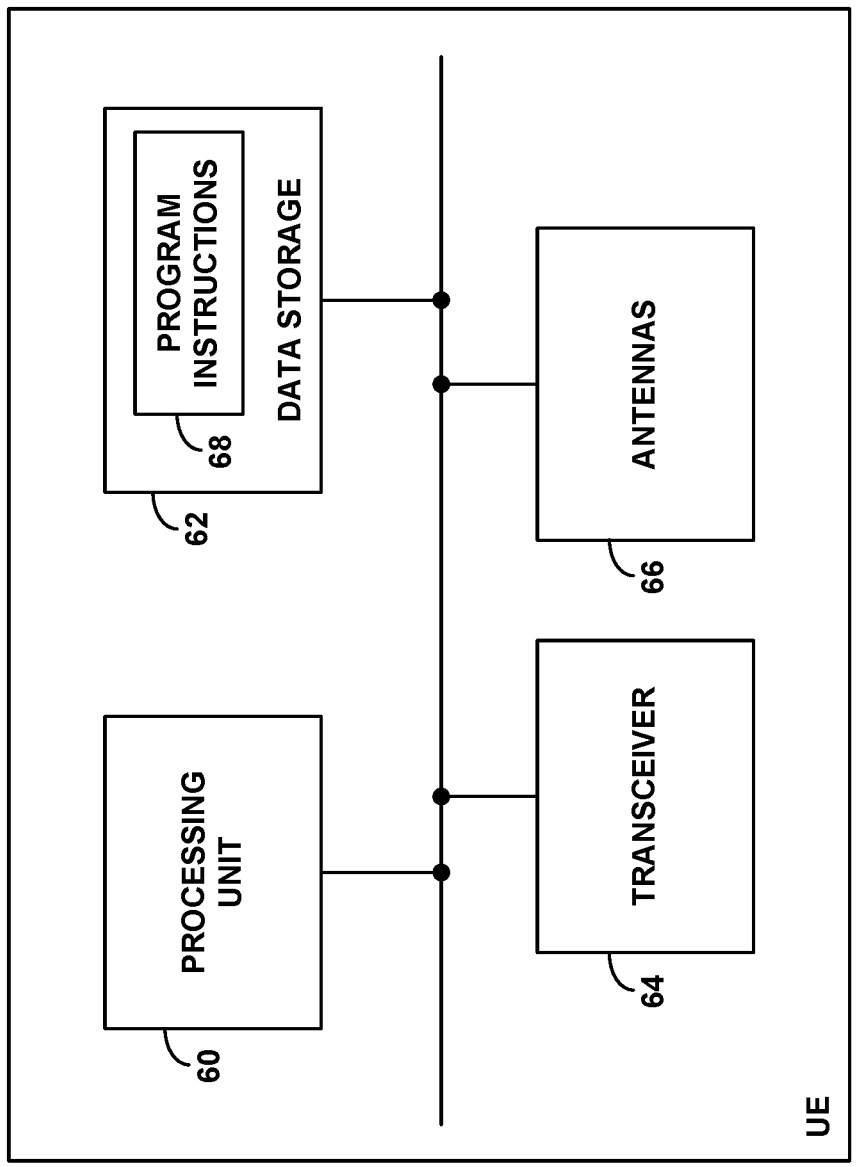
FIG. 6 is a simplified block diagram of an example UE operable in accordance with the disclosure.

FIG. 6 is next a simplified block diagram of an example UE operable in accordance with the present disclosure. As shown in FIG. 6, the example UE includes a processing unit 60, non-transitory data storage 62, a transceiver 64, and a plurality of antennas 66 including at least a first antenna and a second antenna, all of which could be integrated together or interconnected in any of a variety of ways.

In a non-limiting example implementation, the processing unit could comprise one or more microprocessors, and the data storage could comprise one or more volatile and/or non-volatile storage components such as magnetic, optical, or flash storage. As further shown, the data storage could hold program instructions 68, which could be executable by the processing unit to carry out various UE operations described herein. In accordance with those instructions and/or through any of a variety of other configurations, the UE could then be configured to operate as described above, to be served by a base station and to transmit to the base station user-plane data that includes at least a first bit stream and a second bit stream (possibly portions of a larger set of user-plane data).

Various features described above could be implemented in this context, and vice versa.

Exemplary embodiments have been described above. Those skilled in the art will understand, however, that changes and modifications may be made to these embodiments without departing from the true scope and spirit of the invention. For instance, while the description focuses on an implementation in which antennas are closely spaced, an alternative implementation could involve transmission from antennas that are not closely spaced. Further, while the description focuses on an uplink implementation, similar techniques could be applied to facilitate downlink transmission from a base station to a UE. Other examples are possible as well.

We claim:

1. A method for communicating user-plane data between a user equipment device (UE) and a base station, wherein the UE has multiple antennas including a first antenna and a second antenna, the method comprising:
   dividing by the UE the user-plane data into multiple bit streams including at least a first bit stream and a second bit stream;
   orthogonally encoding by the UE the multiple bit streams to produce a first set of multiple encoded bit streams, including encoding the first bit stream with a first binary code to produce a first encoded bit stream of the first set and encoding the second bit stream with a second binary code to produce a second encoded bit stream of the first set, wherein the first binary code is orthogonal to the second binary code;
   at least summing by the UE the multiple encoded bit streams of the first set to produce a first resulting bit stream, wherein the summing of the multiple encoded bit streams of the first set comprises AND'ing the multiple encoded bit streams of the first set together, whereby the orthogonally encoding of the first and second bit streams helps enable the base station to extract the first and second bit streams upon receipt of the first resulting bit stream;
   orthogonally encoding by the UE the multiple bit streams to produce a second set of multiple encoded bit streams, including encoding the first bit stream with a third binary code to produce a first encoded bit stream of the second set and encoding the second bit stream with a fourth binary code to produce a second encoded bit stream of the second set, wherein the third binary code is orthogonal to the fourth binary code;
   at least summing by the UE the multiple encoded bit streams of the second set to produce a second resulting bit stream, wherein the summing of the multiple encoded bit streams of the second set comprises AND'ing the multiple encoded bit streams of the second set together; and
   transmitting by the UE the first resulting bit stream from the first antenna, and transmitting by the UE the second resulting bit stream from the second antenna.

2. The method of claim 1, wherein the first binary code and second binary code have zero cross-correlation with each other.

3. The method of claim 1, wherein the third binary code and fourth binary code have zero cross-correlation between each other.

4. The method of claim 1, wherein the transmitting of the first resulting bit stream and transmitting the second resulting bit stream both occur on a radio frequency carrier having a wavelength $\lambda$ centimeters, and wherein the first and second antennas of the UE are less than $\lambda/2$ centimeters apart from each other.

5. The method of claim 1,
   wherein the encoding of the first bit stream with the first binary code comprises XOR'ing sequential groups of bits of the first bit stream with the first binary code, and
   wherein the encoding of the second bit stream with the second binary code comprises XOR'ing sequential groups of bits of the second bit stream with the second binary code.

6. The method of claim 1, wherein the first and second binary codes are Walsh codes.

7. The method of claim 1, further comprising:
   receiving by the UE from the base station a scheduling directive specifying air interface resources on which the UE is to transmit the first resulting bit stream, wherein the transmitting of the first resulting bit stream occurs on the specified air interface resources in response to the scheduling directive.

8. The method of claim 1, further comprising:
   receiving by the UE at the first antenna a first downlink stream from the base station concurrently with receiving by the UE at the second antenna a second downlink stream from the base station.

9. The method of claim 7, wherein the air interface resources are frequency-time resources.

10. The method of claim 7, wherein the scheduling directive further provides precoding information for use by the UE to precode the transmission of the first resulting bit stream.

11. The method of claim 7, further comprising:
   receiving by the base station the transmission of the first resulting bit stream from the UE on the specified air interface resources;
   applying by the base station the first binary code to extract the first bit stream from the first resulting bit stream;
   applying by the base station the second binary code to extract the second bit stream from the first resulting stream; and
   combining by the base station at least the extracted first and second bit streams to uncover the user-plane data.

12. The method of claim 10, further comprising transmitting by the UE to the base station, from the first antenna, a demodulation reference signal for evaluation by the base station to enable the base station to generate the precoding information.

13. A user equipment device (UE) comprising:
   a processing unit;
   non-transitory data storage;
   a transceiver; and
   a plurality of antennas including a first antenna and a second antenna,
   wherein the UE is configured to be served by a base station and to transmit to the base station user-plane data including at least a first bit stream and a second bit stream, by carrying out operations including:
orthogonally encoding the multiple bit streams to produce a first set of multiple encoded bit streams, including encoding the first bit stream with a first binary code to produce a first encoded bit stream of the first set and encoding the second bit stream with a second binary code to produce a second encoded bit stream of the set, wherein the first binary code is orthogonal to the second binary code,
at least summing the multiple encoded bit streams of the first set to produce a first resulting bit stream, wherein the summing of the multiple encoded bit streams of the first set comprises AND'ing the multiple encoded bit streams of the first set together, whereby the orthogonally encoding of the first and second bit streams helps enable the base station to extract the first and second bit streams upon receipt of the resulting bit stream,
orthogonally encoding the multiple bit streams to produce a second set of multiple encoded bit streams, including encoding the first bit stream with a third binary code to produce a first encoded bit stream of the second set and encoding the second bit stream with a fourth binary code to produce a second encoded bit stream of the second set, wherein the third binary code is orthogonal to the fourth binary code,
at least summing the multiple encoded bit streams of the second set to produce a second resulting bit stream, wherein the summing of the multiple encoded bit streams of the second set comprises AND'ing the multiple encoded bit streams of the second set together, and
transmitting the first resulting bit stream from the first antenna, and transmitting the second resulting bit stream from the second antenna.

14. The UE of claim 13, wherein the first binary code and second binary code have zero cross-correlation between each other.

15. The UE of claim 13, wherein the third binary code and fourth binary code have zero cross-correlation between each other.

16. The UE of claim 13, wherein the first and second binary codes are Walsh codes.

17. The UE of claim 13,
wherein the encoding of the first bit stream with the first binary code comprises XOR'ing sequential groups of bits of the first bit stream with the first binary code, and
wherein the encoding of the second bit stream with the second binary code comprises XOR'ing sequential groups of bits of the second bit stream with the second binary code.

18. The UE of claim 13, wherein the operations further include:
receiving at the first antenna, from the base station, a first downlink bit stream concurrently with receiving at the second antenna, from the base station, a second downlink bit stream.

19. The UE of claim 15, wherein the transmitting of the first resulting bit stream and the second resulting bit stream both occur on a radio frequency carrier having a wavelength $\lambda$ centimeters, and wherein the first and second antennas of the UE are less than $\lambda/2$ centimeters apart from each other.

* * * * *